United States Patent
Hiraiwa et al.

(10) Patent No.: US 7,529,900 B2
(45) Date of Patent: May 5, 2009

(54) COMPUTER SYSTEM AND STORAGE SYSTEM AND VOLUME ASSIGNMENT METHOD

(75) Inventors: Yuri Hiraiwa, Sagamihara (JP); Masaaki Hosouchi, Zama (JP); Katsuhisa Miyata, Yokohama (JP); Nobuhiro Maki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 505 days.

(21) Appl. No.: 11/450,363

(22) Filed: Jun. 12, 2006

(65) Prior Publication Data

US 2007/0266211 A1 Nov. 15, 2007

(30) Foreign Application Priority Data

Apr. 18, 2006 (JP) ............................. 2006-114798

(51) Int. Cl.
*G06F 12/00* (2006.01)
(52) U.S. Cl. ........................ 711/162; 711/114; 711/156; 707/204; 713/324; 714/6
(58) Field of Classification Search ................. 711/162, 711/114, 156; 707/204; 713/324; 714/6
See application file for complete search history.

(56) References Cited

U.S. PATENT DOCUMENTS

| | | | | |
|---|---|---|---|---|
| 5,903,913 A * | 5/1999 | Ofer et al. | .................... | 711/156 |
| 6,529,944 B1 * | 3/2003 | LeCrone | ..................... | 709/211 |
| 6,631,477 B1 * | 10/2003 | LeCrone et al. | ................. | 714/5 |
| 7,146,526 B2 * | 12/2006 | Tomita | ........................... | 714/6 |
| 7,216,210 B2 * | 5/2007 | Tomita | ........................ | 711/162 |
| 7,266,719 B1 * | 9/2007 | LeCrone et al. | ................. | 714/9 |
| 7,281,098 B2 * | 10/2007 | Hiraiwa et al. | ............... | 711/156 |
| 7,373,670 B2 * | 5/2008 | Mimatsu et al. | ................ | 726/27 |
| 2003/0005221 A1 | 1/2003 | Fujimoto et al. | ............ | 711/114 |
| 2005/0111249 A1 | 5/2005 | Yagisawa et al. | ............ | 365/145 |
| 2006/0085607 A1 * | 4/2006 | Haruma | ...................... | 711/161 |

FOREIGN PATENT DOCUMENTS

| JP | 2001-256003 | 9/2001 |
|---|---|---|
| JP | 2005-157710 | 6/2005 |

* cited by examiner

*Primary Examiner*—Stephen C Elmore
(74) *Attorney, Agent, or Firm*—Brundidge & Stanger, P.C.

(57) ABSTRACT

There is provided a computer system which can implement ease of transition to a standby state caused by power-off of a volume and ease of recovery from a standby state while maintaining access performance. A computer system including a storage system (200) having one or more disk units (220) and a disk controller unit (210) which controls reading and writing of data stored on volumes formed by the disk units and a host computer (100) which transmits a data read/write request to the storage system (200), wherein the host computer (100) gives an instruction to perform volume assignment for each of groups each having duplicated sets obtained by multiply duplicating a set composed of one or more volumes on which data is to be stored, and the storage system (200) assigns a first volume of a first duplicated set in the group to one of the disk units (220) which has an attribute different from an attribute of a volume constituting another duplicated set.

20 Claims, 12 Drawing Sheets

FIG.3

| 351 | LOGICAL VOLUME ID | 00 | 01 | ... | 99 |
|---|---|---|---|---|---|
| 352 | STORAGE ID | 1111 | 1111 | | 1111 |
| 353 | ARRAY GROUP ID | 01 | 02 | | 04 |
| 354 | FRAME ID | 00 | 00 | | 01 |
| 355 | USE INFORMATION | 0 | 1 | | 0 |
| 356 | POWER STATUS INFORMATION | ON | ON | | OFF |

STORAGE CONFIGURATION INFORMATION 350

FIG.4

| | | | | |
|---|---|---|---|---|
| 361 — GROUP ID | GRP01 | | GRP05 | |
| 362 — NUMBER OF DUPLICATES REQUIRED | 2 | | 1 | ... |
| 363 — POLICY ID | 1 | 2 | 1 | |
| 364 — POLICY DESCRIPTION | PERFORMANCE | BOOT UP | PERFORMANCE | |

POLICY TABLE 360

FIG.5

| | | | | | | |
|---|---|---|---|---|---|---|
| 371 | DATA VOLUME ID | VOL01 | | VOL11 | | ... |
| 372 | DATA MANAGEMENT GROUP ID | GRP01 | | GRP01 | | |
| 373 | CURRENT NUMBER OF DUPLICATES | 2 | | 2 | | |
| 374 | LOGICAL VOLUME ID | 00 | 05 | 10 | 77 | |
| 375 | ASSIGNED POLICY ID | 1 | 2 | 1 | 2 | |
| 376 | ACTIVE VOLUME INFORMATION | 00 | | 10 | | |

REQUIRED VOLUME DEFINITION INFORMATION 370

FIG.6

| | | |
|---|---|---|
| 381 | DESIGNATED GROUP ID | GRP01 |
| 382 | DATA VOLUME LIST | VOL01,VOL05,VOL99,VOL08 |
| 383 | DESIGNATED OPERATION | " ASSIGNMENT" |

COMMAND PARAMETERS 380

FIG.10

| | | | | | |
|---|---|---|---|---|---|
| 351 — LOGICAL VOLUME ID | 00 | 01 | . . . | 99 |
| 352 — STORAGE ID | 1111 | 1111 | | 1111 |
| 353 — ARRAY GROUP ID | 01 | 02 | | 04 |
| 354 — FRAME ID | 00 | 00 | | 01 |
| 355 — USE INFORMATION | 0 | 1 | | 0 |
| 356 — POWER STATUS INFORMATION | ON | ON | | OFF |
| 357 — ARRAY GROUP PERFORMANCE INFORMATION | HIGH | HIGH | | MEDIUM |
| 358 — FRAME BOOT UP PERFORMANCE INFORMATION | SLOW | SLOW | | FAST |

STORAGE CONFIGURATION INFORMATION 350

COMPUTER SYSTEM AND STORAGE SYSTEM AND VOLUME ASSIGNMENT METHOD

The present application is based on and claims priority of Japanese patent application No. 2006-114798 filed on Apr. 18, 2006, the entire contents of which are hereby incorporated by reference.

BACKGROUND

The present invention relates to a computer system comprising a disk unit and, more particularly, to control of logical volume duplication.

In public and private mission-critical systems constituting social infrastructure, the amount of data has recently been significantly increasing. These systems, of course, have a demand for high availability. For this reason, there is often used a storage system based on a disk array technology typified by RAID (Redundant Arrays of Inexpensive Disks) as shown in Japanese Patent Laid-Open Publication No. 2001-256003. In many cases, data for business affairs to be conducted by such a system is placed on a plurality of volumes because of its amount, and a group of volumes used for each of kinds of business affairs are generally handled as one group. Because of this, there have emerged management techniques for efficiently managing volumes, the number of which is increasing with an increase in data amount. The techniques include one of Japanese Patent Laid-Open Publication No. 2005-157710 which realizes power savings by powering off some of disks.

In each of the prior-art techniques, a group of data volumes for each of kinds of business affairs to be conducted is placed with emphasis on performance when it is to be placed in a storage system. For example, separate volumes which belong to a group are placed in different storage systems or array groups, thereby distributing the load on each disk controller and achieving an increase in I/O speed. If the technique shown in Japanese Patent Laid-Open Publication No. 2005-157710 is applied to this storage system, the volumes within the group are distributed over the plurality of storage systems. Accordingly, the volumes cannot be powered off, and the effect of saving power cannot be obtained. In particular, if each volume is multiply duplicated to prevent any data loss caused by a failure in a storage, the range in which power cannot be turned off may extend with an increase in the number of duplicates.

Assume that all of the volumes of the duplicated group are powered off. In accessing the volumes again, there is a waiting time before the all of target volumes are powered on. The waiting time becomes long depending on the placement status of the volumes.

SUMMARY

The present invention is a computer system comprising a storage system having at least one disk unit and a disk controller unit which controls reading and writing of data stored on a volume formed by the at least one disk unit and a host computer which transmits a data read/write request to the storage system, wherein the host computer gives an instruction to perform volume assignment for each of groups each having duplicated sets obtained by multiply duplicating a set composed of at least one volume on which data is to be stored, and the storage system assigns a first volume of a first duplicated set in the group to one of the at least one disk unit which corresponds to the first volume and has an attribute different from an attribute of a volume constituting another duplicated set of the group.

According to the present invention, when multiply duplicating a plurality of volumes and holding them in a storage system, placement of the volumes can be determined on the basis of different criteria such as performance and the speed of starting/stopping access to a volume. For this reason, it is possible to implement ease of transition to a standby state caused by power-off of a volume and ease of recovery from a standby state while maintaining access performance.

BRIEF DESCRIPTION OF THE DRAWINGS

FIG. 3 is a block diagram of an example of storage configuration information;

FIG. 4 is a block diagram of an example of a policy table;

FIG. 5 is a block diagram of an example of required volume definition information;

FIG. 6 is a block diagram of an example of a set of command parameters;

FIG. 10 is a block diagram of a modification of storage configuration information.

DETAILED DESCRIPTION OF THE PREFERRED EMBODIMENTS

The best modes for carrying out the present invention will be explained.

Embodiments of a computer system and storage system and a volume assignment method of the present invention will be explained below with reference to the drawings.

A first embodiment will first be explained. A storage system according to this embodiment can have a power control function described in Japanese Patent Laid-Open Publication No. 2005-157710. That is, a host computer has a disk power control instruction program which manages disk power control, and the storage system has a disk power control instruction reception program which accepts an instruction about power-on/power-off from outside and a power control circuit which turns on or off the power to a corresponding device in accordance with the instruction.

Figure 1:
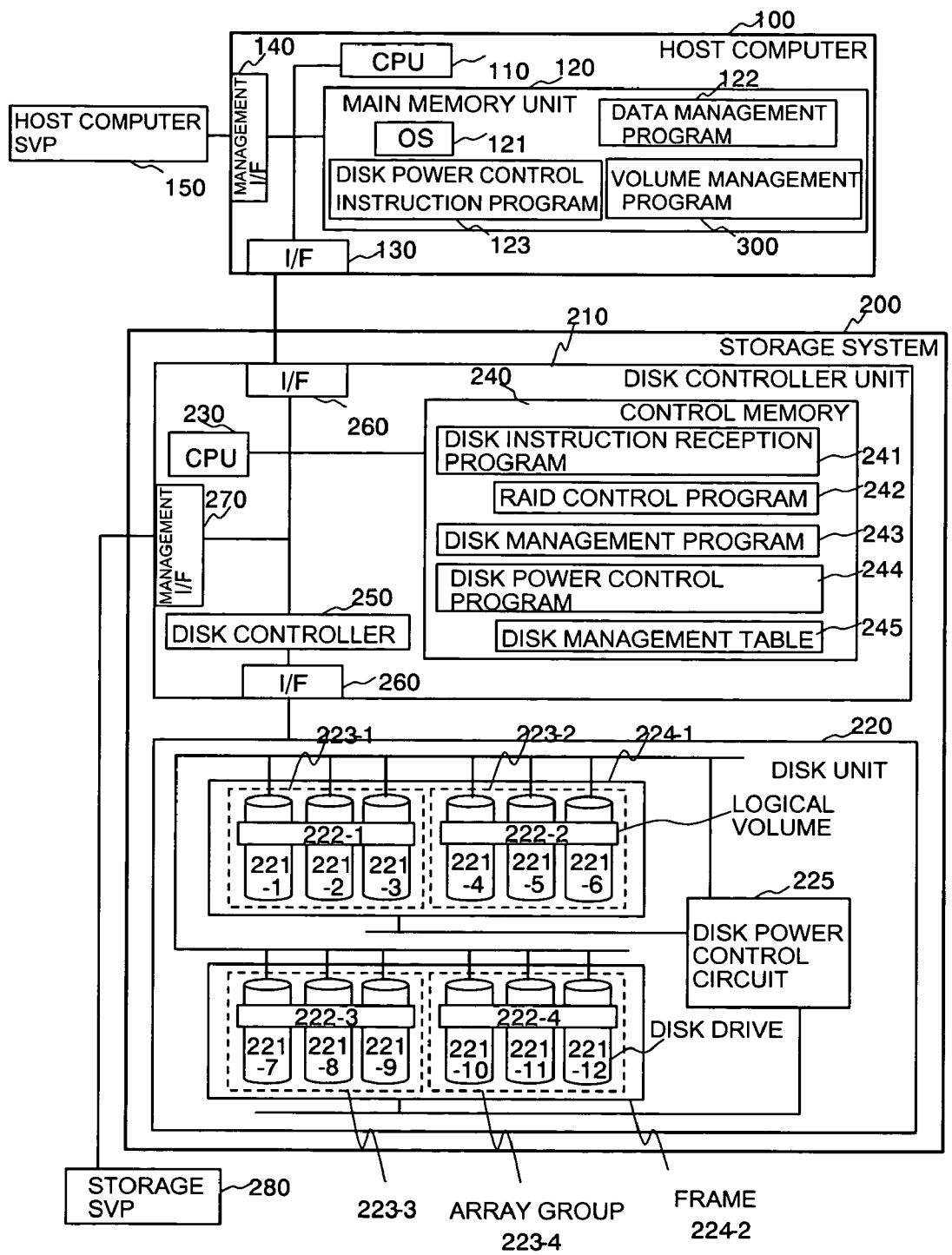
FIG. 1 is a block diagram of a computer system of an embodiment of the present invention.

FIG. 1 is a block diagram of a computer system of this embodiment. The computer system is composed of one host computer 100 and one storage system 200 connected thereto.

The host computer 100 requests the storage system 200 to read and write data required to conduct business affairs or configure the status of the storage system 200. In response to the request from the host computer 100, a disk controller unit 210 reads and writes data from and to a disk unit 220 or configure the status of the disk unit 220.

The host computer 100 is composed of a CPU 110, a main memory unit 120, an interface (I/F) 130, and a management I/F 140. A host computer service processor (SVP) 150 is connected to the host computer 100.

The CPU 110 is a processor in the host computer 100. That is, the CPU 110 reads and runs an OS, program, or the like stored in the main memory unit 120 to execute processing defined in the OS or program.

The main memory unit 120 is composed of a memory unit such as a DRAM. An OS 121, a data management program 122, a disk power control instruction program 123, and a volume management program 300 are stored in the main memory unit 120.

The OS 121 is an operating system of the host computer 100. The OS 121 performs the basic operation of the host computer 100 when being run by the CPU 110.

The data management program 122 is a program which manages data to be handled by the OS 121 and also makes a volume assignment request when storing data in the storage system 200.

Generally, a business program in a computer system may need to handle data whose amount exceeds that of one volume or may make parallel accesses and often accesses a plurality of logical volumes. Thus, it is necessary to manage the plurality of volumes as a group. To meet the need, the data management program 122 performs group management, i.e., configuration and operation for a group. In this embodiment of the present invention, such a group will be called a data management group. An example of a group unit is a plurality of data volumes for each of kinds of business affairs to be conducted by a host computer. Alternatively, an archive group, a consistency group, or a plurality of data volumes constituting a file may be used as a unit.

The volume management program 300 is a program which manages volume assignment in the storage system 200 connected to the host computer 100. The volume management program 300 is read and executed by the CPU 110. The detailed configuration and processing will be described later.

The disk power control instruction program 123 is a program which issues, to the storage system 200, a command to turn on or off the power to a disk of the storage system 200 for management of the power to the disk. The disk power control instruction program 123 is read and executed by the CPU 110.

The I/F 130 is an interface which transmits and receives data to and from the disk controller unit 210.

The host computer SVP 150 is an I/O control terminal which inputs an instruction for, e.g., maintenance to the host computer 100 in accordance with an instruction from an administrator or the like. The host computer 100 has the management I/F 140, which is an interface which transmits and receives data to and from the host computer SVP 150.

The storage system 200 is composed of the disk controller unit 210 and disk unit 220.

The disk controller unit 210 is composed of a CPU 230, a control memory 240, a disk controller 250 which controls a plurality of disk units, two I/Fs 260, and a management I/F 270.

The CPU 230 is a processor in the disk controller unit 210.

The control memory 240 is composed of a memory such as a DRAM. A disk instruction reception program 241, a RAID control program 242, a disk management program 243, a disk power control program 244, and a disk management table 245 are stored in the control memory 240.

The disk instruction reception program 241 is a program which receives, from the host computer 100, a command to turn on or off the power to the disk unit 220, assign a volume, or report the operation status of the storage system 200 and gives the instruction to a program corresponding to the command. The disk instruction reception program 241 is read and executed by the CPU 230.

The RAID control program 242 is a program which controls the storage system 200. The RAID control program 242 is read and executed by the CPU 230.

The disk management table 245 is an area for recording the operation status and the like of each of disks.

The disk management program 243 is a program which manages disks in the disk unit 220 and looks up and updates the disk management table 245 as needed. The disk management program 243 is read and executed by the CPU 230.

The disk power control program 244 is a program which controls power-on/power-off in accordance with an instruction. The disk power control program 244 is read and executed by the CPU 230.

The disk unit 220 has one or more disk drives 221. The disk drives 221 constitute one or more logical areas (logical volumes 222) to have a RAID configuration. The cluster of disk drives 221 constituting each logical volume 222 is called an array group 223. In this embodiment, the logical volumes 222 are identified by logical volume IDs. The disk drives 221 are divided into units of power-on/power-off called frames 224. A disk power control circuit 225 is connected to the frames 224. The disk power control circuit 225 can power on or off the disk drives 221 of each frame 224 separately from the others. Note that power-on/power-off here may refer to power-on/power-off of the entire frame 224, switch-on/switch-off of only rotation of the disk drives 221 belonging to the frame 224, or switch-on/switch-off of both rotation of the disk drives 221 belonging to the frame 224 and accessory equipment such as a fan. In this embodiment, transition of a disk from an enabled state to a disabled state will be genetically referred to power-off while transition of a disk from a disabled state to an enabled state will be genetically referred to power-on.

A storage SVP 280 is an I/O control terminal which inputs an instruction for, e.g., maintenance to the storage system 200 in accordance with an instruction from an administrator or the like. The storage system 200 has the management I/F 270, which is an interface that transmits and receives data to and from the storage SVP 280.

Figure 2:
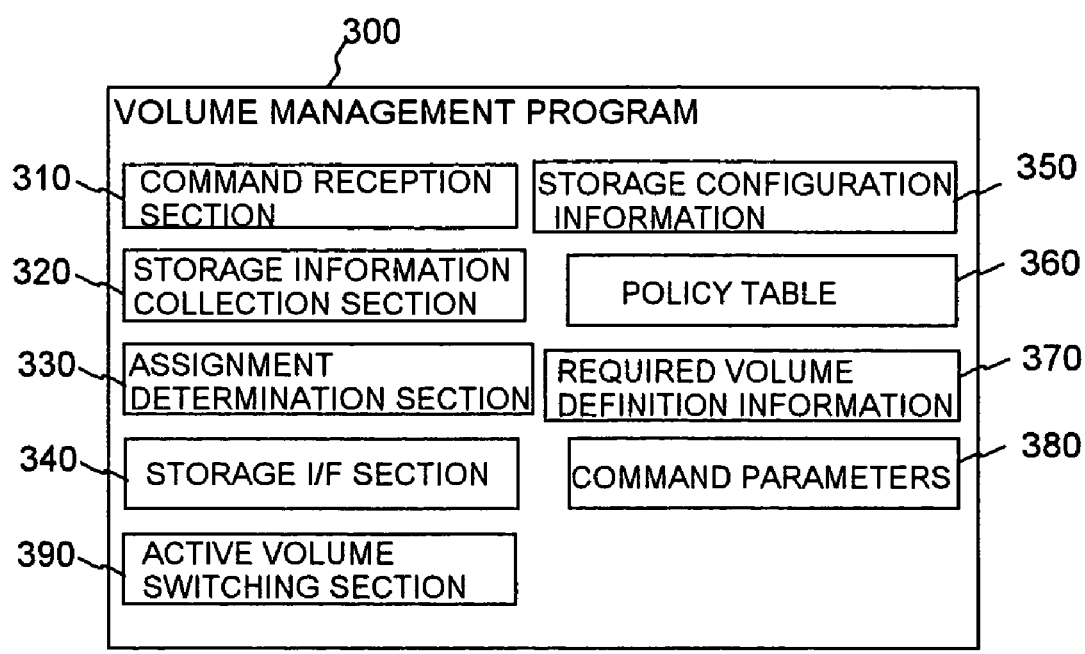
FIG. 2 is a block diagram of a volume management program stored in a control memory.

FIG. 2 is a block diagram of the volume management program 300. The volume management program 300 includes a command reception section 310, a storage information collection section 320, an assignment determination section 330, a storage I/F section 340, storage configuration information 350, a policy table 360, required volume definition information 370, command parameters 380, and an active volume switching section 390.

The command reception section 310 receives a volume assignment request from the data management program 122, a user, or the like, stores parameters of the received command as the command parameters 380, and instructs the assignment determination section 330 to perform assignment operation.

The storage information collection section 320 acquires the configuration information of the storage system 200 and stores it as the storage configuration information 350 at a user's request or upon receipt of a predetermined trigger.

In accordance with an instruction passed from the command reception section 310, the assignment determination section 330 determines volume assignment using the storage configuration information 350 and information in the policy table 360 and instructs the storage I/F section 340 to issue a command. The assignment determination section 330 also stores the determined volume assignment information in an area for the required volume definition information 370.

The storage I/F section 340 performs I/O for the storage system 200 in response to a request from the storage information collection section 320 or assignment determination section 330.

The active volume switching section 390 selects one to be used from duplicated volumes before using a volume. The active volume switching section 390 stores information on the selected active volume in the area for the required volume definition information 370.

FIG. 3 is a block diagram of an example of the storage configuration information 350. An identifier for a logical volume is stored as a logical volume ID 351. An identifier for the target storage system 200 is stored as a storage ID 352. Information such as a serial number may be used as this identifier. Information for identifying in which array group 223 the logical volume in question is placed is stored as an array group ID 353. Information for identifying in which frame 224 the logical volume in question is placed is stored as a frame ID 354. Information indicating whether the logical volume in question is already assigned is stored as a piece 355 of use information. This embodiment assumes that "1" indicates assigned while "0" indicates unassigned. Information indicating whether the logical volume in question is in an enabled state is stored as a piece 356 of power status information. This embodiment also assumes that "ON" indicates power-on and an enabled state while "OFF" indicates power-off and a disabled state.

FIG. 4 is a block diagram of an example of the policy table 360. An identifier for a data management group is stored as a group ID 361. The number of duplicated volumes to be made when a volume contained in the data management group in question is multiply duplicated is stored as the number 362 of duplicates required. An identifier for identifying a policy is stored as a policy ID 363. A policy for selecting a volume to be assigned is stored as a policy description 364. This embodiment assumes that "performance" indicates a policy of distributing and placing volumes contained in the data management group over a plurality of array groups with emphasis on access performance while "boot up" indicates a policy of concentrating the volumes contained in the data management group in a single frame or a few frames with emphasis on the speed of switching between a disabled state and an enabled state. One or more sets of the policy ID 363 and the policy description 364 are described such that the number of sets corresponds to the number stored as the number 362 of duplicates required.

Note that an explanation will be given on the assumption that the policy table 360 is configured in advance by an administrator or the like, e.g., through the host computer SVP 150.

If there are a plurality of policy IDs for a certain group ID, assignment is performed in ascending order of the policy IDs in this embodiment. Alternatively, an area for designating the order may be separately provided, and assignment may be performed on the basis of the area.

In this embodiment, the description(s) of a policy (policies) for each group ID 361 will be collectively called policy information.

FIG. 5 is a block diagram of an example of the required volume definition information 370. An identifier for a data volume managed by the OS 121 and data management program 122 is stored as a data volume ID 371. An identifier for a data management group to which the data volume in question belongs is stored as a data management group ID 372. The number of duplicated volumes made when the data volume in question is multiply duplicated is stored as the current number 373 of duplicates. An identifier for an assigned logical volume is stored as a logical volume ID 374. Information for identifying one of policies described in the policy table 360, in accordance with which the logical volume in question is assigned, is stored as an assigned policy ID 375. One or more sets of the logical volume ID 374 and the assigned policy ID 375 are described such that the number of sets corresponds to the number stored as the current number 373 of duplicates. A logical volume ID indicating which one of a single logical volume or a plurality of logical volumes having ID(s) described as the logical volume ID(s) 374 is to be used when using the data volume in question is stored as a piece 376 of active volume information. In this embodiment, when duplicated logical volumes are held, virtualization in which a volume to be used is switched is implemented by the programs on the host computer. Alternatively, it may be implemented on a storage system. In this case, since volume power status information to be used in an active volume switching process (to be described later) can be acquired from the disk management table 245 of the storage system 200, the power status information at this time can be used instead of that obtained when the storage information collection section 320 acquires information from the storage system 200.

FIG. 6 is a block diagram of an example of the set of command parameters 380. An identifier for a data management group to which a data volume as an assignment destination belongs is stored as a designated group ID 381. A list of identifiers for data volumes requesting assignment is stored as a data volume list 382. A designated operation 383 indicates an operation which the volume management program 300 is to perform. Assume that the assignment determination section 330 is executed if "assignment" is designated while the active volume switching section 390 is executed if "active switching" is designated. Note that if "active switching" is designated, the data volume list 382 is designated to be empty, and the designated group ID 381 is used as parameter information.

FIGS. 7(A) to 7(E) are explanatory diagrams representing a result of volume assignment according to this embodiment and enabled and disabled states of volumes caused by the assignment. An explanation will be given here on the assumption that a data management group GRP01 contains four data volumes VOL01, VOL05, VOL99, and VOL08 shown in FIG. 7(A) and that they are doubly assigned. A volume corresponding to the data volume VOL01 will be denoted by A; one corresponding to the data volume VOL05, B; one corresponding to the data volume VOL99, C; and one corresponding to the data volume VOL08, D. An explanation will be given while showing correspondences using the reference characters. For the sake of simplicity, a description of frames and array groups to which volumes necessary for the explanation are not assigned and volumes unnecessary for the explanation will be omitted.

Figure 7A:
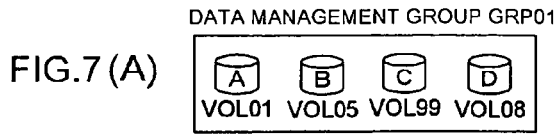
FIGS. 7(A) to 7(E) are diagrams for explaining a result of volume assignment according to the embodiment of the present invention.
Figure 7B:
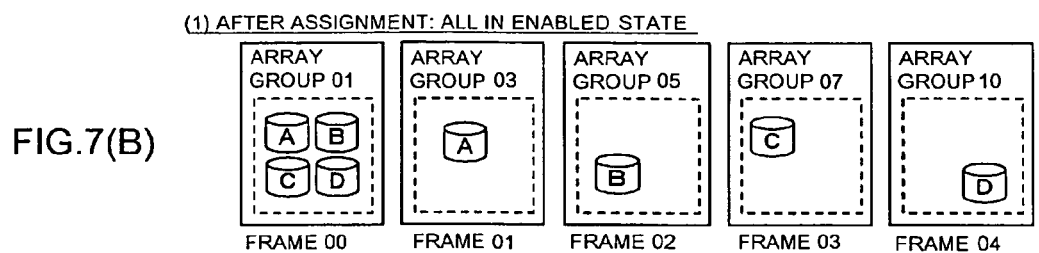

State (1) indicates that logical volumes are assigned as a result of the processing by the assignment determination section according to this embodiment, as shown in FIG. 7(B). One of the two sets of the volumes A, B, C, and D in the group is concentrated in a frame 00. The other of the two sets, the volumes A, B, C, and D are distributed and placed over the array groups 03, 05, 07, and 10, respectively. The former set is assigned on the basis of a policy description of "boot up" while the latter set is assigned on the basis of a policy description of "performance." The volumes of the latter set are placed in the different array groups. Since I/O load is distributed when accessing the volumes of the group GRP01, high access performance can be expected. The group attribute of a group consisting of the volumes A, B, C, and D of the array group 01 is "single" while the group placement of a group consisting of the volume A of the array group 03, the volume B of the array group 05, the volume C of the array group 07, and the volume D of the array group 10 is "distributed." The group placement may be set to "concentrated in a single or a few."

Figure 7C:
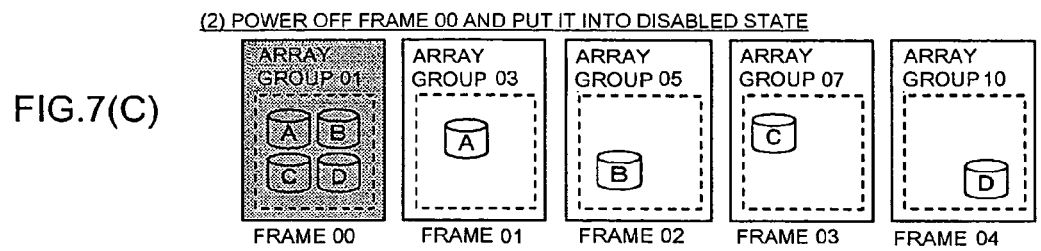

State (2) indicates that after state (1), the frame 00 is powered off and disabled by the technique described in Japanese Patent Laid-Open Publication No. 2005-157710, as shown in FIG. 7(C). In FIG. 7(C), a portion which is powered off and disabled is shaded. Transition from state (1) to state (2) makes it possible for a user to obtain the effect of saving power corresponding to the frame 00. The transition also makes it possible to prevent abrasion of parts of the frame 00 and prolong the total operating time.

Figure 7D:
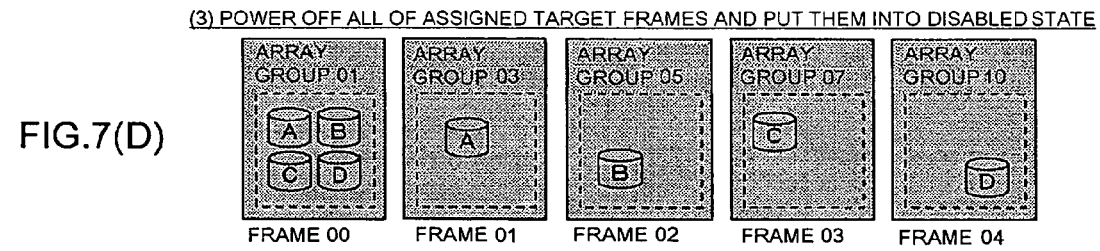

State (3) indicates that after state (2), frames 01, 02, 03, and 04 are powered off and disabled due to, e.g., a decrease in the frequency of use of the volumes of the group GRP01 by a user, as shown in FIG. 7(D).

Figure 7E:
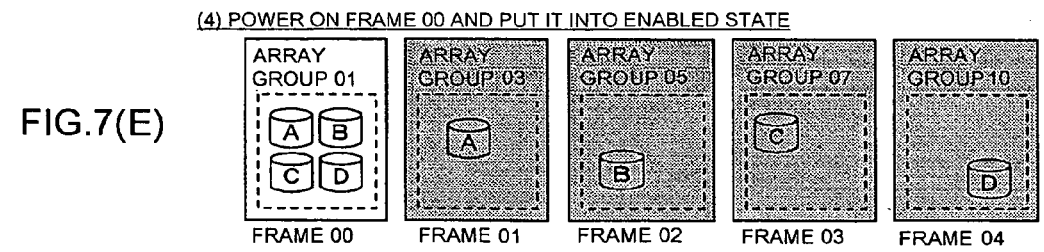

State (4) indicates that after state (3), a user accesses one of the volumes of the group GRP01 again, as shown in FIG. 7(E). In this embodiment, the frame 00 is first powered on and put into an enabled state. With this operation, all of the volumes A, B, C, and D of the group GRP01 get into an enabled state and become accessible. To initially power on all of the frames 01, 02, 03, and 04 and put them into an enabled state, it is necessary to wait for the completion of power control for all the four frames. This prolongs the waiting time. According to this embodiment, the frame 00 is first booted up to allow access there to. After that, the other frames are booted up as needed. That is, the frames are restored to state (1), thereby maintaining the access performance and implementing fast boot up.

With logical volume placement shown in (1) by the assignment determination unit according to this embodiment as described above, access performance equivalent to that obtained by conventional distributed placement can be maintained while obtaining the power saving effect shown in Japanese Patent Laid-Open Publication No. 2005-157710 and extending the disk operating time. Also, the waiting time until restoration to an enabled state when the power control technique shown in Japanese Patent Laid-Open Publication No. 2005-157710 is used can be minimized.

Note that if a user positively knows a mode of operation to be adopted such as one in which the logical volumes of the data management group in question are not accessed, the user may cause the frames 01, 02, 03, and 04 to directly transit from state (1) to state (4) by initially putting the frames into a disabled state. Even if the volumes of the frames 01, 02, 03, and 04 are not immediately available, e.g., during migration of the volumes to tapes, the accessible state can be maintained at low cost by keeping the volumes of the frame 00 in an enabled state.

Figure 8A:
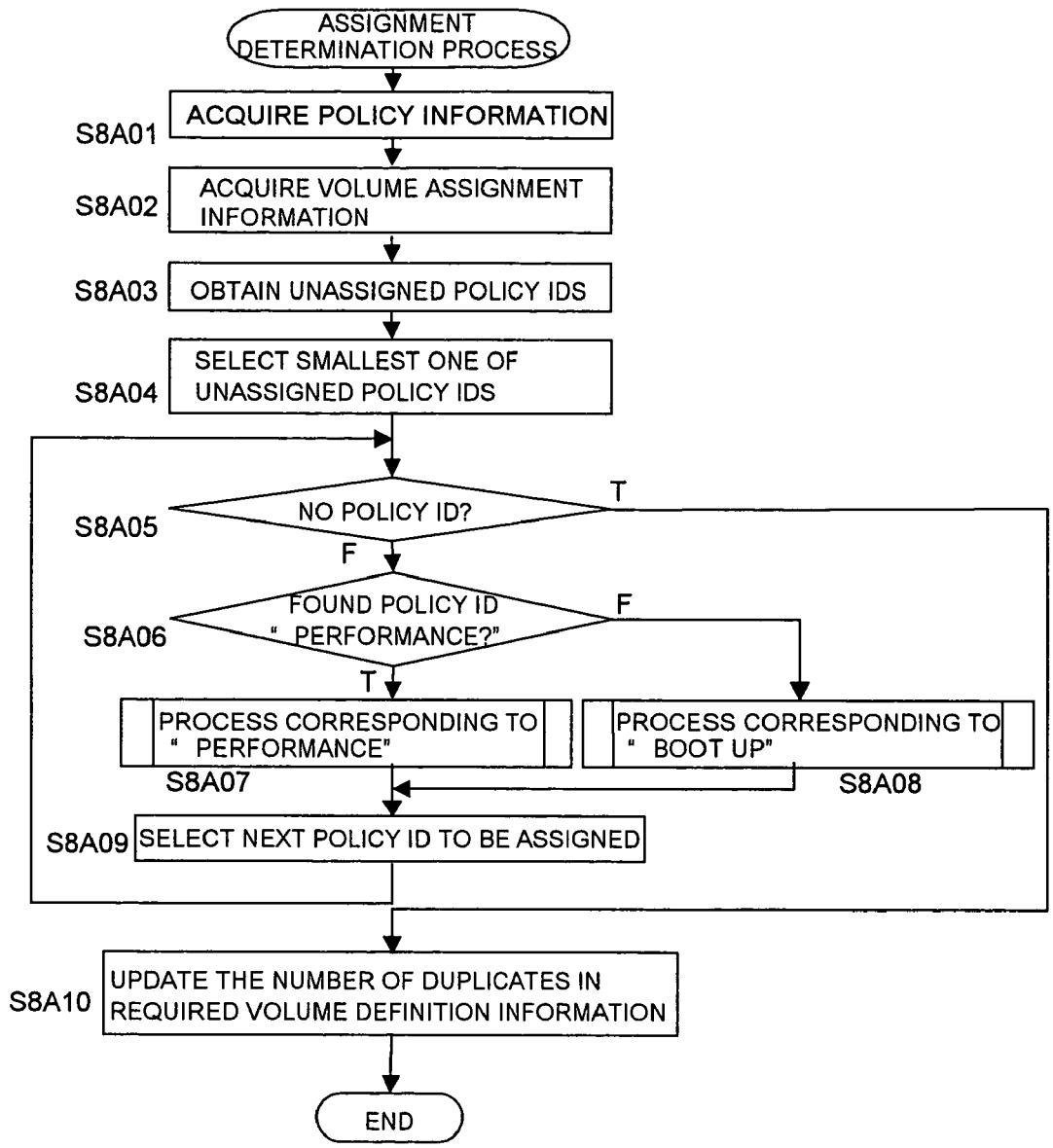
FIG. 8A is a flowchart of a process of an assignment determination section.
Figure 8B:
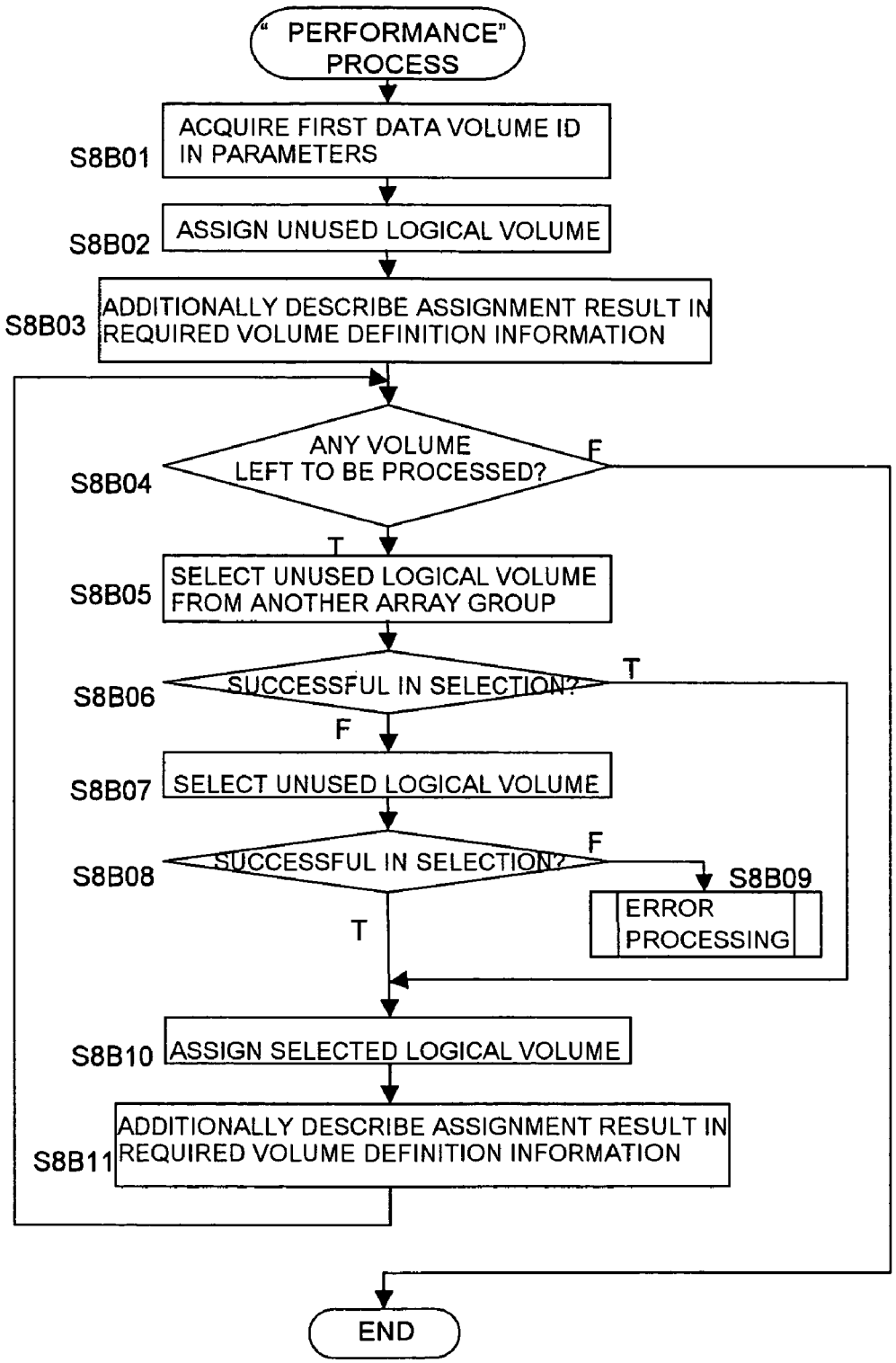
FIG. 8B is a flowchart of a process of the assignment determination section.
Figure 8C:
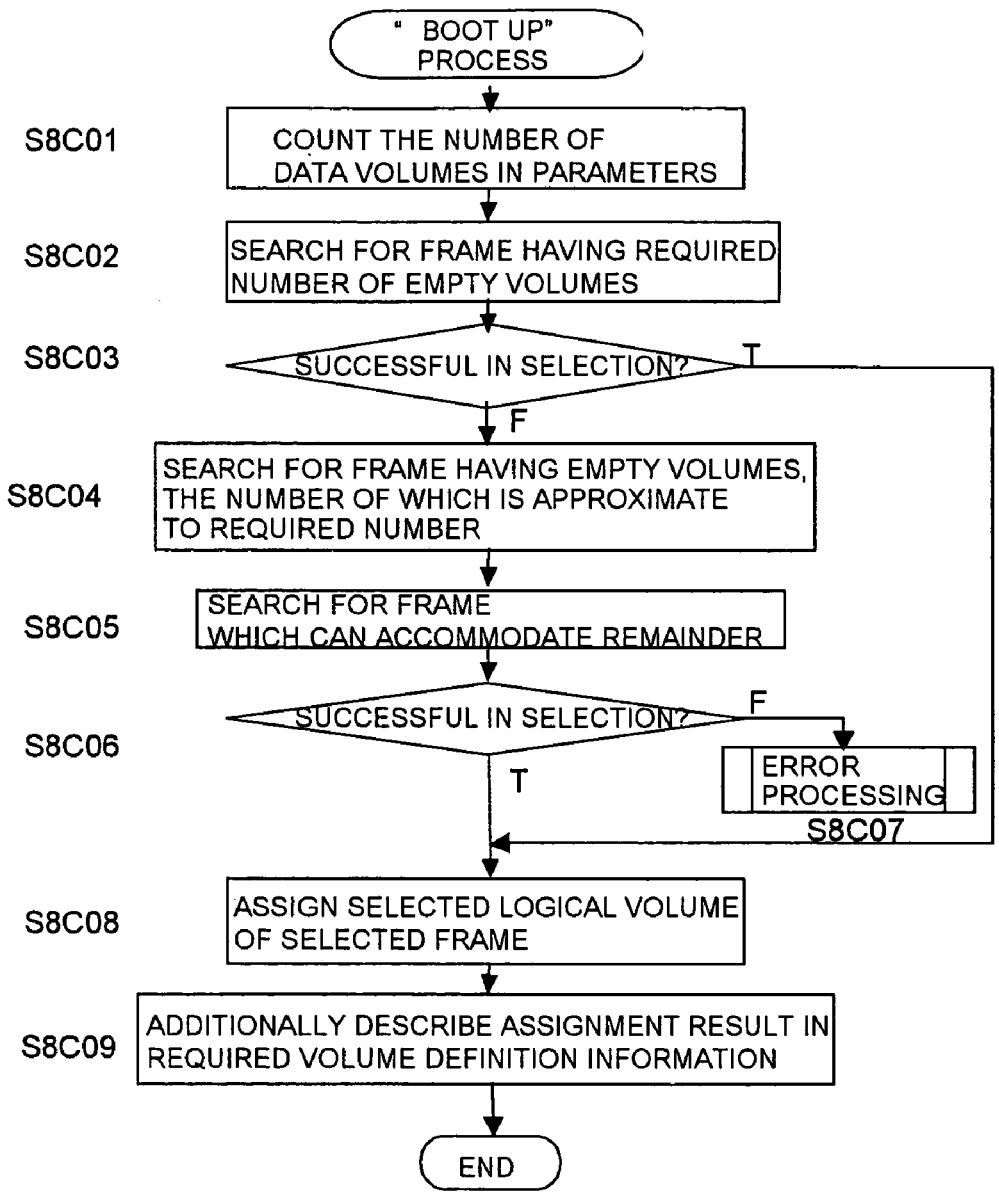
FIG. 8C is a flowchart of a process of the assignment determination section.

An example of a specific process of the computer system according to this embodiment will be explained next. FIGS. 8A to 8C are flow charts of the assignment determination section 330. The overall flow will first be explained with reference to FIG. 8A. The assignment determination section 330 having received an instruction from the command reception section 310 acquires, from the policy table 360, the policy information of the group ID 361, which is equal in value to the designated group ID 381 of the designated command parameters 380 (S8A01). The assignment determination section 330 then acquires, from the required volume definition information 370, the volume assignment information of the data management group ID 372, which is equal in value to the designated group ID 381 of the designated command parameters 380 (S8A02). The assignment determination section 330 compares the policy ID(s) 363 acquired in S8A01 with the assigned policy ID(s) 375 of the volume assignment information acquired in S8A02 and acquires an unassigned one or unassigned ones of the policy ID(s) 363 (S8A03). The assignment determination section 330 selects the smallest one of the assigned policy ID(s) 363 acquired in S8A03 (S8A04). The assignment determination section 330 determines whether there is found any policy ID to be selected (S8A05). If there is found any policy ID to be selected, the assignment determination section 330 determines whether the policy description 364 in the policy table 360 corresponding to the selected policy ID 363 is "performance" (S8A06). If the condition in S8A06 is true, the assignment determination section 330 performs an assignment process based on the "performance" side policy (S8A07). The details of the process will be described later. The flow advances to S8A09. On the other hand, if the condition in S8A06 is false, the assignment determination section 330 performs an assignment process based on the "boot up" side policy (S8A08). The details of the process will be described later. The flow advances to S8A09. In S8A09, the assignment determination section 330 selects the second smallest one of the selected policy ID(s) of the policy ID(s) 363 acquired in S8A03, and the flow returns to S8A05 (S8A09). If there is found no policy ID to be selected or the found policy ID is null in S8A05, the flow advances to S8A10 (S8A05). The assignment determination section 330 updates the corresponding current number 373 of duplicates of the required volume definition information 370 (S8A10), and the process ends.

The details of the process in S8A07 performed when a policy description is "performance" will be explained with reference to FIG. 8B. The assignment determination section 330 acquires the first of data volume IDs described in the data volume list 382 of the command parameters 380 (S8B01). The assignment determination section 330 then selects an unused one whose piece 355 of use information is "0" from logical volumes described in the storage configuration information 350 and performs assignment (S8B02). The assignment determination section 330 additionally describes a set of pieces of information, i.e., a logical volume ID and an assigned policy ID obtained as the assignment result in an area for the corresponding data volume ID 371 and data management group ID 372 of the required volume definition information 370 (S8B03). The assignment determination section 330 determines whether there is any data volume ID left to be subjected to assignment processing in the command parameters 380 (S8B04). If the condition in S8B04 is true, the assignment determination section 330 selects, from the volumes described in the storage configuration information 350, one whose piece 355 of use information is "0" and whose array group ID 353 is different from that of the previously assigned logical volume (S8B05). The assignment determination section 330 determines whether it has been able to select any logical volume in S8B05 (S8B06). If the condition in S8B06 is false, the assignment determination section 330 selects one whose piece 355 of use information is "0" from the volumes described in the storage configuration information 350 (S8B07). This means that selection of a logical volume of an array group to which another data volume belonging to the same data management group is assigned is allowed. The assignment determination section 330 determines whether it has been able to select any logical volume in S8B07 (S8B08). If the condition in S8B08 is false, i.e., there is no selectable logical volume, the assignment determination section 330 performs error processing such as outputting an error message, and the assignment determination process ends (S8B09). If the condition in S8B06 is true or the condition in S8B08 is true, the assignment determination section 330 assigns the selected logical volume (S8B10). The assignment determination section 330 additionally describes a set of pieces of information, i.e., a logical volume ID and an assigned policy ID obtained as the assignment result in an area for the corresponding data volume ID 371 and data management group ID 372, and the flow returns to S8B04 (S8B11). If the condition in S8B04 is false, i.e., volume assignment for the policy ID in question is completed, the process ends, and the flow returns to the flowchart illustrated in FIG. 8A.

The details of the process in S8A08 when a policy description is "boot up" will finally be explained with reference to FIG. 8C. The assignment determination section 330 first counts the number of data volumes described in the data volume list 382 of the command parameters 380 (S8C01). The assignment determination section 330 then selects, in the storage configuration information 350, a frame having logical volumes whose pieces 355 of use information are "0", the number of which is equal to or larger than the number of logical volumes calculated in S8C01 (i.e., a frame having a required number of empty volumes). If there are a plurality of such frames, the assignment determination section 330 selects a frame having empty volumes, the number of which is most approximate to the number of volumes calculated in S8C01 (S8C02). The assignment determination section 330 determines whether it has been able to select any frame in S8C02 (S8C03). If the condition in S8C03 is false, the assignment determination section 330 searches for and selects, in the storage configuration information 350, a frame having logical volumes whose pieces 355 of use information are "0", the number of which is the largest (i.e., a frame having empty volumes, the number of which is approximate to the required number) (S8C04). The assignment determination section 330 subtracts the number of logical volumes whose pieces 355 of use information are "0" of the frame found in S8C04 from the number of volumes calculated in S8C01. The assignment determination section 330 searches for and selects, in the storage configuration information 350, a frame having logical volumes whose pieces 355 of use information are "0", the number of which is equal to or larger than the difference (i.e., a frame which can accommodate the remainder) (S8C05). The assignment determination section 330 determines whether the selection in S8C04 and that in S8C05 are successfully performed (S8C06). If the condition in S8C06 is false, the assignment determination section 330 determines that assignment is impossible. The assignment determination section 330 performs error processing such as outputting an error message, and the assignment determination process ends (S8C07). If the condition in S8C03 is true or the condition in S8C06 is true, the assignment determination section 330 assigns the logical volumes whose pieces 355 of use information are "0" of the selected frame(s) as candidates (S8C08). The assignment determination section 330 additionally describes sets of pieces of information, i.e., logical volume IDs and assigned policy IDs obtained as the assignment result in areas for the corresponding data volume IDs 371 and data management group IDs 372 (S8C09). The process ends, and the flow returns to the flowchart illustrated in FIG. 8A.

The processing of the assignment determination section 330 has been described above. By adopting a method of comparing the information in the policy table 360 with the assignment status in the required volume definition information 370, as in the flow, assignment processing associated with an added policy can be performed even if the number of duplicates for a data management group, which is initially set to one, is changed to two or the number of duplicates, which is two or more, is further increased.

Figure 9:
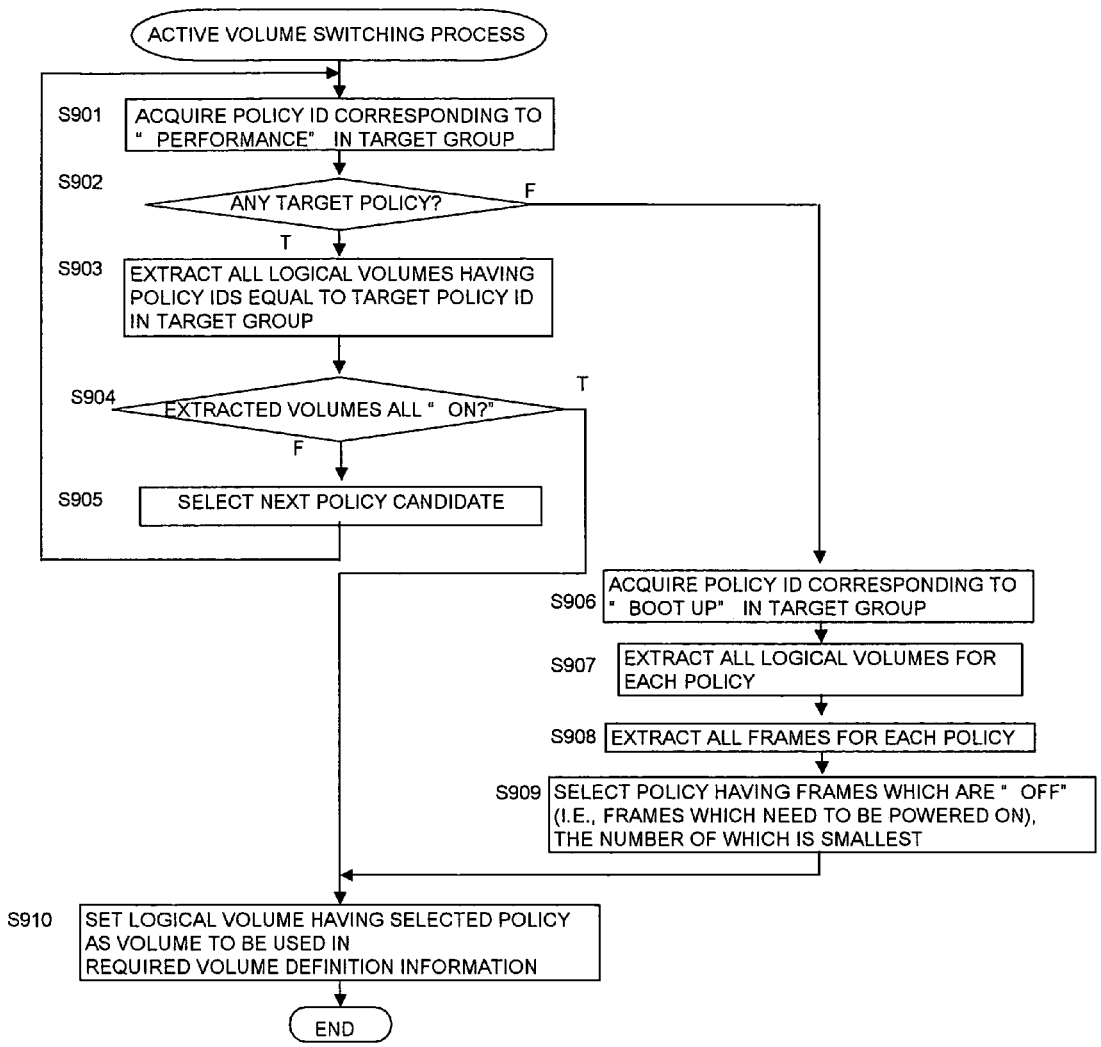
FIG. 9 is a flowchart of a process of an active volume switching section.

FIG. 9 is a flowchart of the active volume switching section 390. The active volume switching section 390 having received an instruction from the command reception section 310 acquires, from the policy table 360, the policy ID 363 of a policy whose group ID 361 is equal in value to the designated group ID 381 of the command parameters 380 and whose policy description 364 is "performance" (S901). The active volume switching section 390 determines whether there is found any policy ID to be processed (S902). If the condition in S902 is true, the active volume switching section 390 extracts all of the logical volume IDs 374 of logical volumes whose assigned policy IDs 375 are equal in value to the policy ID 363 and whose data management group ID 372 is equal in value to the designated group ID 381 (S903). The active volume switching section 390 determines whether the logical volumes extracted in S903 are all powered on, i.e., whether the corresponding pieces 356 of power status information of the volumes having the logical volume IDs 351 are all "ON" in the storage configuration information 350 (S904). If the condition in S904 is false, the active volume switching section 390 selects a policy ID as the next candidate whose policy description is "performance," the flow returns to S902 (S905). On the other hand, if the condition in S902 is false, the active volume switching section 390 acquires, from the policy table 360, the policy IDs 363 of policies whose group IDs 361 are equal in value to the designated group ID 381 of the command parameters 380 and whose policy descriptions 364 are "boot up" (S906). The active volume switching section 390 extracts, for each of the policy IDs acquired in S906, all of the logical volume IDs 374 of logical volumes whose assigned policy IDs 375 are equal in value to the policy ID 363 and whose data management group ID 372 is equal in value to the designated group ID 381 (S907). The active volume switching section 390 extracts, from the storage configuration information 350, the frame ID 354 of the logical volume whose logical volume ID 351 is equal in value to each of the logical volume IDs 374 acquired in S907 (S908). The active volume switching section 390 selects one of the policy IDs having ones, whose pieces 356 of power status information are "OFF" (indicating the need for power-on), of the frame IDs acquired in S908, the number of which is the smallest. The flow advances to S910 (S909). If the condition in S904 is true or after the process in S909, the active volume switching section 390 sets, in the required volume definition information 370, the piece 376 of active volume information of each of the data volumes whose data management group IDs 372 are equal in value to the designated group ID 381 to be equal to the logical volume ID 374 of a logical volume whose assigned policy ID 375 is equal to the selected policy ID 363 (S910). After that, the process ends.

In this embodiment, one storage system is connected to a host computer. Alternatively, a plurality of storage systems may be connected. In this case, an identifier can be made unique in a computer system according to this embodiment by creating the identifier by combining identifiers such as a logical volume ID and array group ID with an identifier using the serial number or the like of each storage system. Accordingly, the processing described in this embodiment can be applied to the case.

Also, in this embodiment, assignment is performed at a request made at the time of volume assignment. Alternatively, assignment may be performed, e.g., at a user's request to reserve a volume before assignment.

A modification of the embodiment of the present invention will be explained next. The modification is basically the same as the first embodiment, and differences will be described below. In the embodiment, there are two types of policy descriptions, "performance" and "boot up." The types may be further divided.

FIG. 10 is a diagram for explaining a modification of the storage configuration information 350. A piece 357 of array group performance information and a piece 358 of frame boot up performance information are added to the storage configuration information 350 according to the embodiment. An identifier for making a classification according to an attribute required at the time of access such as the performance of a target array group is stored as the piece 357 of array group performance information. This modification assumes that any of three types, "high," "medium," and "low" is set. An identifier for making a classification according to an attribute such as the time required to switch to an enabled state or the time required to switch to a disabled state of the target frame is stored as the piece 358 of frame boot up performance information. This modification assumes that any of three types, "fast," "medium," and "slow" is set.

Note that information acquired from the storage system 200 by the storage information collection section 320 is stored as the storage configuration information 350. The piece 357 of array group performance information and piece 358 of frame boot up performance information may be set by a user.

A combination of "high performance" and "fast boot up" is described as an example of the policy description 364 of the policy table 360 according to this modification. That is, a combination of "performance" and any of "high," "medium," and "low" is combined with a combination of "boot up" and any of "fast," "medium," and "slow." The criteria correspond to information added to the storage configuration information 350 according to this modification.

Differences in the processing of the assignment determination section 330 between the embodiment and this modification will be described below.

In S8B02 of FIG. 8B, a logical volume whose piece 355 of use information is "0" is selected from the volumes described in the storage configuration information 350. In this modification, a logical volume whose piece 355 of use information is "0" and whose piece 357 of array group performance information coincides with information given as a corresponding one of the policy descriptions 364 is selected.

In S8B05 of FIG. 8B, a logical volume whose piece 355 of use information is "0" and whose array group ID 353 is different from that of the previously assigned logical volume is selected from the volumes described in the storage configuration information 350. In this modification, a logical volume whose piece 355 of use information is "0", whose array group ID 353 is different from that of the previously assigned logical volume, and whose piece 357 of array group performance information coincides with the information given as the corresponding policy description 364 is selected.

In S8B07 of FIG. 8B, a logical volume whose piece 355 of use information is "0" is selected from the volumes described in the storage configuration information 350. In this modification, a logical volume whose piece 355 of use information is "0" and whose piece 357 of array group performance information coincides with the information given as the policy description 364 is selected.

In S8C02 of FIG. 8C, a frame having logical volumes whose pieces 355 of use information are "0", the number of which is equal to or larger than the number of volumes calculated in S8C01 is selected from the storage configuration information 350. In this modification, a frame having logical volumes whose pieces 355 of use information are "0", the number of which is equal to or larger than the number of volumes calculated in S8C01, and whose pieces 358 of frame boot up performance information coincide with the information given as the corresponding policy description 364 is selected from the storage configuration information 350. The same applies to a case where there are a plurality of such frames.

In S8C04 of FIG. 8C, a frame having logical volumes whose pieces 355 of use information are "0", the number of which is the largest, is selected from the storage configuration information 350. In this modification, a frame having logical volumes whose pieces 355 of use information are "0", the number of which is the largest, and whose pieces 358 of frame boot up performance information coincide with the information given as the policy description 364 is selected from the storage configuration information 350.

In 8C05 of FIG. 8C, the number of logical volumes whose pieces 355 of use information are "0" of the frame selected in S8C04 is subtracted from the number of volumes calculated in S8C01, and a frame having logical volumes whose pieces 355 of use information are "0", the number of which is equal to or larger than the difference is selected. In this modification, the number of logical volumes whose pieces 355 of use information are "0" of the frame selected in S8C04 is subtracted from the number of volumes calculated in S8C01, and a frame having logical volumes whose pieces 355 of use information are "0", the number of which is equal to or larger than the difference, and whose pieces 358 of frame boot up performance information coincide with the information given as the policy description 364 is selected.

The modification has been explained above. In any of the embodiment and modification, when duplicated volumes are placed for each of groups, the duplicated volumes are divided into a plurality of sets, and a volume placement policy is given to each of the sets. The switching between the policies may be performed depending on the length of time spent on the use of data. If the plurality of policies include a combination of one specific to normal operation with emphasis on, e.g., access performance and one specific to operation switching with emphasis on, e.g., power-saving operation of volumes or rapid transition to an enabled state, drawbacks of placements based on the policies can be removed.

According to another (second) embodiment of the present invention, a computer system of the present invention is a computer system, wherein at least one of at least one disk unit has an attribute different from an attribute of another of the disk units, a disk controller unit holds a difference in attribute between the disk units as configuration information, and a storage system assigns a volume of one duplicated set in each of at least one of groups to one of the disk units which has an attribute different from an attribute of another duplicated set of the group.

According to another (third) embodiment of the present invention, the computer system of the second embodiment is a computer system, wherein an attribute of the disk units is one of switching of a disk unit from a disabled state to an enabled state at high speed and switching at low speed.

According to another (fourth) embodiment of the present invention, the computer system of the third embodiment is a computer system, wherein if ones of the at least one disk unit to which volumes are assigned are all in a disabled state at the time of reading and writing of data, the storage system boots up one of the at least one disk unit whose speed of switching to an enabled state is high.

According to another (fifth) embodiment of the present invention, the computer system of the second embodiment is a computer system, wherein an attribute of the at least one disk unit is one of high-speed access to a disk unit and low-speed access.

According to another (sixth) embodiment of the present invention, the computer system of the first embodiment is a computer system, wherein each of duplicated sets is composed of at least two volumes, and when assigning at least two volumes constituting a first duplicated set in one of the groups to at least one first disk unit of the at least one disk unit and placing and assigning at least two volumes constituting another duplicated set of the group to at least one of the at least one disk unit, the storage system assigns the at least two volumes constituting the another duplicated set to the at least one such that the at least two volumes constituting the another duplicated set have a placement relationship different from a placement relationship of the at least two volumes constituting the first duplicated set.

According to another (seventh) embodiment of the present invention, the computer system of the sixth embodiment is a computer system, wherein the storage system concentrates and assigns one duplicated set in at least one of the groups to one of a single frame and a few frames of the at least one disk unit and distributes and assigns another duplicated set of the group over a large number of frames.

According to another (eighth) embodiment of the present invention, there is provided a storage system comprising at least one disk unit and a disk controller unit which controls reading and writing of data from and to the at least one disk unit, wherein the disk controller unit receives, from a host computer, an instruction to perform volume assignment for each of groups each having duplicated sets obtained by multiply duplicating a set composed of at least one volume and assigns a first volume of a first duplicated set in the group to one of the at least one disk unit which corresponds to the first volume and has an attribute different from an attribute of a volume constituting another duplicated set of the group.

According to another (ninth) embodiment of the present invention, the storage system of the eighth embodiment is a storage system, wherein at least one of the at least one disk unit has an attribute different from an attribute of another of the at least one disk unit, the disk controller unit holds a difference in attribute between the at least one disk unit as configuration information, and a volume of one duplicated set in each of at least one of the groups is assigned to one of the at least one disk unit which has an attribute different from an attribute of another duplicated set of the group.

According to another (10th) embodiment of the present invention, the storage system of the ninth embodiment is a storage system, wherein an attribute of the at least one disk unit is one of switching of a disk unit from a disabled state to an enabled state at high speed and switching at low speed.

According to another (11th) embodiment of the present invention, the storage system of the 10th embodiment is a storage system, wherein if ones of the at least one disk unit to which volumes are assigned are all in a disabled state at the time of reading and writing of data, one of the at least one disk unit whose speed of switching to an enabled state is high is booted up.

According to another (12th) embodiment of the present invention, the storage system of the ninth embodiment is a storage system, wherein an attribute of the at least one disk unit is one of high-speed access to a disk unit and low-speed access.

According to another (13th) embodiment of the present invention, the storage system of the eighth embodiment is a storage system, wherein each of the duplicated sets is composed of at least two volumes, and when assigning at least two volumes constituting a first duplicated set in one of the groups to at least one first disk unit of the at least one disk unit and placing and assigning at least two volumes constituting another duplicated set of the group to at least one of the at least one disk unit, the disk controller unit assigns the at least two volumes constituting the another duplicated set to the at least one such that the at least two volumes constituting the another duplicated set have a placement relationship different from a placement relationship of the at least two volumes constituting the first duplicated set.

According to another (14th) embodiment of the present invention, the storage system of the 13th embodiment is a storage system, wherein one duplicated set in each of at least one of the groups is concentrated and assigned to one of a single frame and a few frames of the at least one disk unit, and another duplicated set of the group is distributed and assigned over a large number of frames.

According to another (15th) embodiment of the present invention, there is provided a volume assignment method in a computer system comprising a storage system including at least one disk unit and a disk controller unit which controls reading and writing of data from and to the at least one disk unit and a host computer which transmits a data read/write request to the storage system, wherein the host computer instructs the storage system to perform volume assignment for each of groups each having duplicated sets obtained by multiply duplicating a set composed of at least one volume on which the data is to be stored, and the storage system assigns a first volume of a first duplicated set in the group to one of the at least one disk unit which corresponds to the first volume and has an attribute different from an attribute of a volume constituting another duplicated set of the group.

According to another (16th) embodiment of the present invention, the volume assignment method of the 15th embodiment is a volume assignment method including holding, as configuration information, a difference in attribute between the at least one disk unit having a plurality of attributes and assigning a volume of one duplicated set in each of at least one of the groups to one of the at least one disk unit which has an attribute different from an attribute of another duplicated set of the group.

According to another (17th) embodiment of the present invention, the volume assignment method of the 16th embodiment is a volume assignment method, wherein each of the plurality of attributes of the at least one disk unit is one of switching of a disk unit from a disabled state to an enabled state at high speed and switching at low speed.

According to another (18th) embodiment of the present invention, the volume assignment method of the 16th embodiment is a volume assignment method, wherein each of the plurality of attributes of the at least one disk unit is one of high-speed access to a disk unit and low-speed access.

According to another (19th) embodiment of the present invention, the volume assignment method of the 15th embodiment is a volume assignment method, wherein each of the duplicated sets is composed of at least two volumes, and when assigning at least two volumes constituting a first duplicated set in one of the groups to at least one first disk unit of the at least one disk unit and placing and assigning at least two volumes constituting another duplicated set of the group to one of the at least one disk unit, the storage system assigns the at least two volumes constituting the another duplicated set to the at least one such that placement of the at least two volumes constituting the another duplicated set is different from placement of the at least two volumes constituting the first duplicated set.

According to another (20th) embodiment of the present invention, the volume assignment method of the 19th embodiment is a volume assignment method including concentrating and assigning one duplicated set in each of at least one of the groups to one of a single frame and a few frames of the at least one disk unit and distributing and assigning another duplicated set of the group over a large number of frames.

What is claimed is:

1. A computer system comprising:
    a storage system having at least one disk unit and a disk controller unit which controls reading and writing of data stored on volumes formed by the at least one disk unit and a host computer which transmits a data read/write request to the storage system,
    wherein the host computer gives an instruction to perform volume assignment for each of groups each having duplicated sets obtained by multiply duplicating a set composed of at least one volume on which data is to be stored, and
    the storage system assigns a first volume of a first duplicated set in the group to one of the at least one disk unit which corresponds to the first volume and has an attribute different from an attribute of a volume constituting another duplicated set of the group.

2. The computer system according to claim 1, wherein
    at least one of the at least one disk unit has an attribute different from an attribute of another of the at least one disk unit, the disk controller unit holds a difference in attribute between the at least one disk unit as configuration information, and the storage system assigns a volume of one duplicated set in each of at least one of the groups to one of the at least one disk unit which has an attribute different from an attribute of another duplicated set of the group.

3. The computer system according to claim 2, wherein
    an attribute of the at least one disk unit is one of switching of a disk unit from a disabled state to an enabled state at high speed and switching at low speed.

4. The computer system according to claim 3, wherein
    if ones of the at least one disk unit to which volumes are assigned are all in a disabled state at the time of reading and writing of data, the storage system boots up one of the at least one disk unit whose speed of switching to an enabled state is high.

5. The computer system according to claim 2, wherein
    an attribute of the at least one disk unit is one of high-speed access to a disk unit and low-speed access.

6. The computer system according to claim 1, wherein
    each of the duplicated sets is composed of at least two volumes, and
    when assigning at least two volumes constituting a first duplicated set in one of the groups to at least one first disk unit of the at least one disk unit and placing and assigning at least two volumes constituting another duplicated set of the group to at least one of the at least one disk unit, the storage system assigns the at least two volumes constituting the another duplicated set to the at least one such that the at least two volumes constituting the another duplicated set have a placement relationship different from a placement relationship of the at least two volumes constituting the first duplicated set.

7. The computer system according to claim 6, wherein
    the storage system concentrates and assigns one duplicated set in each of at least one of the groups to one of a single frame and a few frames of the at least one disk unit and distributes and assigns another duplicated set of the group over a large number of frames.

8. A storage system comprising:
    at least one disk unit and a disk controller unit which controls reading and writing of data from and to the at least one disk unit,
    wherein the disk controller unit
    receives, from a host computer, an instruction to perform volume assignment for each of groups each having duplicated sets obtained by multiply duplicating a set composed of at least one volume and
    assigns a first volume of a first duplicated set in the group to one of the at least one disk unit which corresponds to the first volume and has an attribute different from an attribute of a volume constituting another duplicated set of the group.

9. The storage system according to claim 8, wherein
    at least one of the at least one disk unit has an attribute different from an attribute of another of the at least one disk unit, the disk controller unit holds a difference in attribute between the at least one disk unit as configuration information, and a volume of one duplicated set in each of at least one of the groups is assigned to one of the at least one disk unit which has an attribute different from an attribute of another duplicated set of the group.

10. The storage system according to claim 9, wherein
    an attribute of the at least one disk unit is one of switching of a disk unit from a disabled state to an enabled state at high speed and switching at low speed.

11. The storage system according to claim 10, wherein
    if ones of the at least one disk unit to which volumes are assigned are all in a disabled state at the time of reading and writing of data, one of the at least one disk unit whose speed of switching to an enabled state is high is booted up.

12. The storage system according to claim 9, wherein
    an attribute of the at least one disk unit is one of high-speed access to a disk unit and low-speed access.

13. The storage system according to claim 8, wherein
    each of the duplicated sets is composed of at least two volumes, and
    when assigning at least two volumes constituting a first duplicated set in one of the groups to at least one first disk unit of the at least one disk unit and placing and assigning at least two volumes constituting another duplicated set of the group to at least one of the at least one disk unit, the disk controller unit assigns the at least two volumes constituting the another duplicated set to the at least one such that the at least two volumes constituting the another duplicated set have a placement relationship different from a placement relationship of the at least two volumes constituting the first duplicated set.

14. The storage system according to claim 13, wherein
    one duplicated set in each of at least one of the groups is concentrated and assigned to one of a single frame and a few frames of the at least one disk unit, and another duplicated set of the group is distributed and assigned over a large number of frames.

15. A volume assignment method in a computer system comprising a storage system including at least one disk unit and a disk controller unit which controls reading and writing of data from and to the at least one disk unit and a host computer which transmits a data read/write request to the storage system,
    wherein the host computer instructs the storage system to perform volume assignment for each of groups each having duplicated sets obtained by multiply duplicating a set composed of at least one volume on which the data is to be stored, and the storage system assigns a first volume of a first duplicated set in the group to one of the at least one disk unit which corresponds to the first volume and has an attribute different from an attribute of a volume constituting another duplicated set of the group.

16. The volume assignment method according to claim 15, including holding, as configuration information, a difference in attribute between the at least one disk unit having a plurality of attributes and assigning a volume of one duplicated set in each of at least one of the groups to one of the at least one disk unit which has an attribute different from an attribute of another duplicated set of the group.

17. The volume assignment method according to claim 16, wherein each of the plurality of attributes of the at least one disk unit is one of switching of a disk unit from a disabled state to an enabled state at high speed and switching at low speed.

18. The volume assignment method according to claim 16, wherein each of the plurality of attributes of the at least one disk unit is one of high-speed access to a disk unit and low-speed access.

19. The volume assignment method according to claim 15, wherein each of the duplicated sets is composed of at least two volumes, and when assigning at least two volumes constituting a first duplicated set in one of the groups to at least one first disk unit of the at least one disk unit and placing and assigning at least two volumes constituting another duplicated set of the group to one of the at least one disk unit, the storage system assigns the at least two volumes constituting the another duplicated set to the at least one such that the at least two volumes constituting the another duplicated set have a placement relationship different from a placement relationship of the at least two volumes constituting the first duplicated set.

20. The volume assignment method according to claim 19, wherein one duplicated set in each of at least one of the groups is concentrated and assigned to one of a single frame and a few frames of the at least one disk unit, and another duplicated set of the group is distributed and assigned over a large number of frames.

* * * * *